US011205971B2

(12) United States Patent
Bassi et al.

(10) Patent No.: US 11,205,971 B2
(45) Date of Patent: *Dec. 21, 2021

(54) METHOD FOR OPERATING A MULTILEVEL INVERTER WITH A SINUSOIDAL OUTPUT VOLTAGE

(71) Applicant: KING ABDULAZIZ UNIVERSITY, Jeddah (SA)

(72) Inventors: Hussain Bassi, Rabigh (SA); Muhyaddin Jamal Rawa, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,895

(22) Filed: Jun. 16, 2021

(65) Prior Publication Data

US 2021/0313905 A1 Oct. 7, 2021

Related U.S. Application Data

(60) Division of application No. 17/029,598, filed on Sep. 23, 2020, now Pat. No. 11,133,754, which is a continuation of application No. 15/800,578, filed on Nov. 1, 2017, now Pat. No. 10,840,823.

(51) Int. Cl.
| H02M 7/5387 | (2007.01) |
| H02J 1/00 | (2006.01) |
| H02M 1/12 | (2006.01) |
| H02M 7/483 | (2007.01) |
| H02J 1/08 | (2006.01) |

(52) U.S. Cl.
CPC ............ *H02M 7/5387* (2013.01); *H02J 1/00* (2013.01); *H02M 1/12* (2013.01); *H02M 7/483* (2013.01); *H02J 1/082* (2020.01)

(58) Field of Classification Search
CPC ...... H02M 7/5387; H02M 7/483; H02M 1/12; H02J 1/00; H02J 1/082
See application file for complete search history.

(56) References Cited

U.S. PATENT DOCUMENTS

| 6,969,967 B2 | 11/2005 | Su |
| 7,808,125 B1 | 10/2010 | Sachdeva et al. |
| 8,536,734 B2 * | 9/2013 | Johnson ............... H02M 7/483 307/77 |
| 8,619,446 B2 | 12/2013 | Liu et al. |

(Continued)

OTHER PUBLICATIONS

U.S. Appl. No. 17/029,598, filed Sep. 23, 2020, US 2021-0006179 A1, Hussain Bassi, et al.

(Continued)

*Primary Examiner* — Jared Fureman
*Assistant Examiner* — Michael J Warmflash
(74) *Attorney, Agent, or Firm* — Oblon, McClelland, Maier & Neustadt, L.L.P.

(57) ABSTRACT

A multilevel inverter includes an inner DC source group circuit that generates a plurality of voltage levels, and an outer DC source group circuit that generates a substantially sinusoidal output voltage. The substantially sinusoidal output voltage is generated using, at least in part, the plurality of voltage levels generated by the inner DC source group circuit. An H-bridge circuit supplies the substantially sinusoidal output voltage at alternating polarities to a load.

5 Claims, 12 Drawing Sheets

(56) References Cited

U.S. PATENT DOCUMENTS

| | | | |
|---|---|---|---|
| 10,396,681 B1* | 8/2019 | Bassi | H02M 7/53871 |
| 10,819,250 B1* | 10/2020 | Bassi | H02M 7/483 |
| 10,840,823 B2* | 11/2020 | Bassi | H02J 1/00 |
| 10,917,021 B1* | 2/2021 | Bassi | H02M 1/088 |
| 11,133,754 B2* | 9/2021 | Bassi | H02M 1/12 |
| 2005/0127853 A1* | 6/2005 | Su | H02M 1/0095 318/108 |
| 2011/0198935 A1 | 8/2011 | Hinman et al. | |
| 2019/0131886 A1 | 5/2019 | Bassi | |

OTHER PUBLICATIONS

U.S. Appl. No. 15/800,578, filed Nov. 1, 2017, US-2019-0131886-A1, Hussain Bassi, et al.

U.S. Appl. No. 16/984,750, filed Aug. 4, 2020, US 2020-0366217 A1, Hussain Bassi, et al.

* cited by examiner

| State | $V_o/V_{o,max}$, pu | $V_o/V$ | ON Switches |
|---|---|---|---|
| 1 | 0 | 0 | 1,4 |
| 2 | $V_{dc}$ | $V_1$ | 2,4 |
| 3 | $V_{dc}$ | $V_2-V_1$ | 3,5,6 |
| 4 | $2V_{dc}$ | $V_2$ | 1,5,6 |
| 5 | $3V_{dc}$ | $V_2+V_1$ | 2,5,6 |
| 6 | $3V_{dc}$ | $V_3+V_2-V_1$ | 3,5,7 |
| 7 | $4V_{dc}$ | $V_3+V_2$ | 1,5,7 |
| 8 | $5V_{dc}$ | $V_3+V_2+V_1$ | 2,5,7 |

FIG. 4

METHOD FOR OPERATING A MULTILEVEL INVERTER WITH A SINUSOIDAL OUTPUT VOLTAGE

CROSS-REFERENCE TO RELATED APPLICATIONS

The present application is a Divisional of U.S. application Ser. No. 17/029,598, now allowed, having a filing date of Sep. 23, 2020, which is a Continuation of U.S. application Ser. No. 15/800,578, now U.S. Pat. No. 10,840,834, having a filing date of Nov. 1, 2017.

BACKGROUND

Field of the Invention

The present disclosure relates to multilevel inverters which generate alternating current (AC) voltages of various levels from one or more direct current (DC) sources. Specifically, the present disclosure relates to multilevel inverters that generate various levels of AC voltages with a reduced number of components.

Description of the Related Art

Multilevel inverters have shown promise because of the low harmonic distortion in their output waveforms, low switching device stress, and general reduced switching stress in the circuitry. These features make multilevel inverters good choices in, for example, flexible alternating current transmission systems (FACTS), hybrid vehicles, solar installations, and many other applications. Conventional topologies for these circuits include neutral-point clamped, or diode clamped, (NPC) inverters, flying capacitor (FC) inverters, switched series/parallel sources (SSPS) inverters, series-connected switched sources (SCSS), and cascaded H-bridge inverters. The most common form of control for these inverters is sinusoidal pulse width modulation (SPWM).

Conventional multilevel inverters still suffer from limitations that limit their wide-spread use. For example, in order to limit harmonic content and improve the sinusoidal waveform of an inverter's output, the output level of a multilevel inverter should be increased. This, however, makes balancing of DC-link across the sub-circuits of the inverter more difficult, and requires additional components, such as clamping diodes and/or series capacitors in order to maintain DC-link balance in conventional multilevel inverters. Therefore, there remains a need for a multilevel inverter circuit that is able to generate multiple voltage level outputs using a reduced set of components and without sacrificing low harmonic distortion in the waveform of the output voltage.

SUMMARY

The present disclosure solve the limitations of the present multilevel inverters by providing a multilevel inverter that is able to generate a variety of output voltages without increasing the harmonic distortion in the output and without increasing circuit switching stress while reducing the number of components in the multilevel inverter circuit.

In an exemplary aspect, a multilevel inverter includes an inner DC source group circuit that generates a plurality of voltage levels, and an outer DC source group circuit that generates a substantially sinusoidal output voltage. The substantially sinusoidal output voltage is generated using, at least in part, the plurality of voltage levels generated by the inner DC source group circuit. An H-bridge circuit supplies the substantially sinusoidal output voltage at alternating polarities to a load.

In another exemplary aspect, the outer DC source group circuit includes at least two DC voltage sources, and a plurality of switching elements that selectively interconnect the at least to DC voltage sources. The plurality of switching elements also provide an output a voltage of the selectively interconnected the at least two DC voltage sources to the H-bridge circuit.

In a further exemplary aspect, the inner DC source group includes at least one DC source, and a plurality of switching elements that selectively connect the at least one DC source to the outer DC source group circuit.

In another exemplary aspect, a voltage of the at least two DC voltage sources of the outer DC source group circuit is the same.

In another exemplary aspect, a voltage level of the at least one DC voltage source of the inner DC source group circuit is twice a voltage level of the at least two DC voltage sources of the outer DC source group circuit.

In another exemplary aspect, one of the at least to DC voltage sources of the outer DC source group circuit is connected in opposite polarity of the other of the at least to DC voltage sources.

In another exemplary aspect, the H-bridge circuit includes at least four switching elements to provide the substantially sinusoidal output voltage to the load in alternating polarities.

In another exemplary aspect, alternate pairs of switching elements of the at least four switching elements of the H-bridge circuit are turned on in order to generate the alternating polarities.

In another exemplary aspect, the switching elements of the outer DC source group circuit, the inner DC source group circuit, and the H-bridge are isolated gate bipolar transistors (IGBT).

In a further exemplary aspect, the multilevel inverter apparatus includes a control circuit that controls the switching of the switching elements of the inner DC source group circuit and the switching elements of the outer DC source group circuit.

In another exemplary aspect, the control circuit is further configured to control the switching of the switching elements of the H-bridge circuit.

In another exemplary aspect, the control circuit controls the switching elements of the inner DC source group circuit and the switching elements of the outer DC source group circuit to switch at different frequencies.

In another exemplary aspect, a total number of switching elements of the inner DC source group circuit and the outer DC source group circuit is given by Nswitch=2n+8, where n is a number of voltage levels of the multilevel inverter apparatus.

In another exemplary aspect, a total number of DC voltage sources of the inner DC source group circuit and the outer DC source group circuit is given by Nsources=n+2, n being the number of voltage levels of the multilevel inverter apparatus.

In an exemplary aspect, a method of operating a multilevel inverter apparatus incudes generating a plurality of voltage levels with an inner DC source group circuit of the multilevel inverter apparatus. The method also includes generating a substantially sinusoidal output voltage with an outer DC source group circuit of the multilevel inverter apparatus, where the substantially sinusoidal output voltage is based on the plurality of voltage levels, at least in part, and supplying the substantially sinusoidal output voltage at alternating polarities to a load with an H-bridge circuit.

In another exemplary aspect, the method includes selectively interconnecting, with switching elements, DC voltage sources included in the outer DC source group circuit to generate the substantially sinusoidal output voltage.

In another exemplary aspect, the method includes selectively interconnecting, with switching elements, DC voltage sources included in the inner DC source group circuit to generate the plurality of voltage levels. The method also includes providing, via at least one switching element, the plurality of voltage levels to the outer DC source group voltage.

In a further exemplary aspect, the method includes controlling, with control circuitry, the selective interconnection of DC voltage sources included in the outer DC source group circuit and the selective interconnection of the DC voltage sources in the inner DC source group circuit.

In another exemplary aspect, the method includes switching, with the control circuitry, alternate pairs of switching elements in the H-bridge circuit to provide the substantially sinusoidal output voltage at the alternating polarities to the load.

In an exemplary aspect, a flexible alternating current transmission system includes a multilevel inverter apparatus. The multilevel inverter apparatus includes an inner DC source group circuit configured to generate a plurality of voltage levels, and an outer DC source group circuit configured to generate a substantially sinusoidal output voltage using, at least in part, the plurality of voltage levels generated by the inner DC source group circuit. The multilevel inverter apparatus also includes an H-bridge circuit configured to output the substantially sinusoidal output voltage at alternating polarities. The flexible alternating current transmission system also includes a load that receives the substantially sinusoidal output voltage at the alternating polarities from the H-bridge circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a table relating switching patterns to output voltages of a multilevel inverter according to exemplary aspects of the present disclosure;

DETAILED DESCRIPTION

Figure 1:
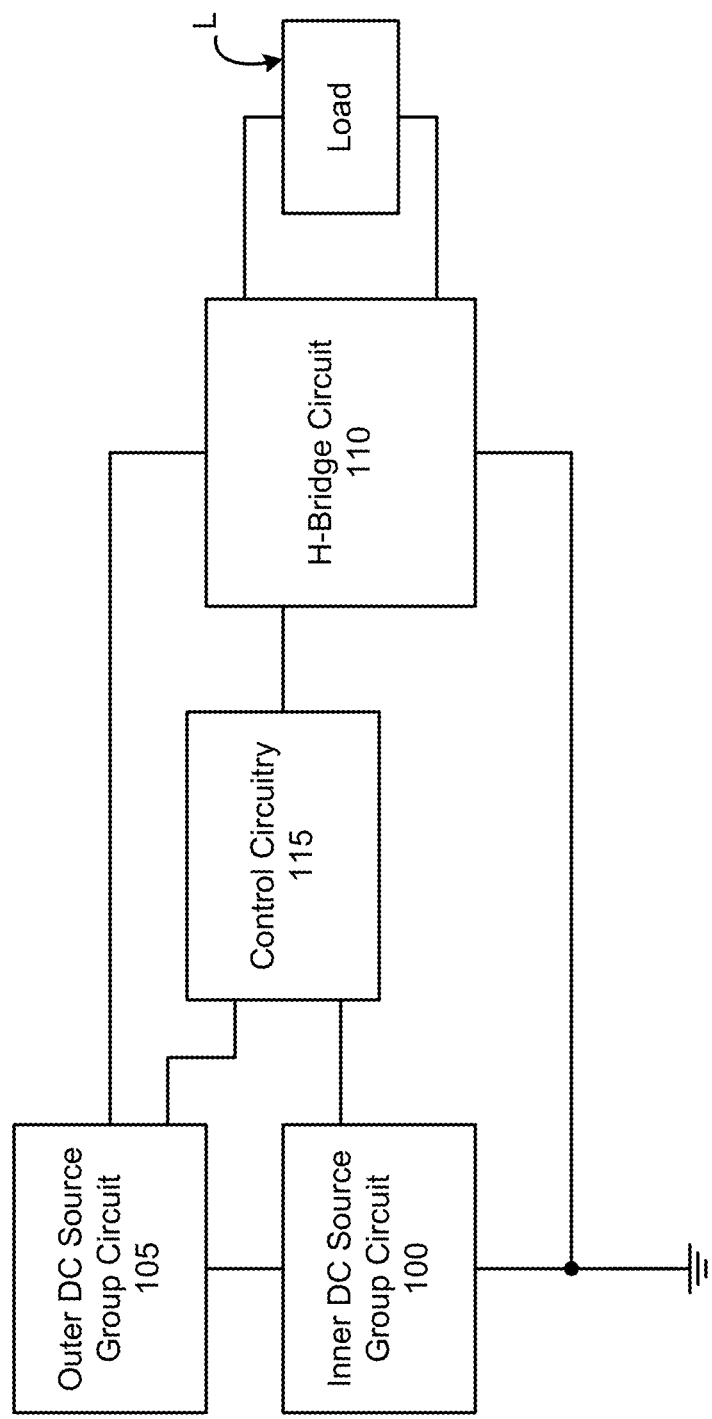
FIG. 1 is a block diagram of a multilevel inverter according to exemplary aspects of the present disclosure.

Referring now to the drawings, wherein like reference numerals designate identical or corresponding parts throughout the several views, FIG. 1 is a block diagram of a multilevel inverter according to exemplary aspects of the present disclosure. The multilevel inverter of FIG. 1 includes an outer DC source group circuit 105 that includes one or more DC sources and one or more switching elements to generate square waveforms, or voltage blocks, that approximate a sinusoidal wave form. Connected to the outer DC source group 105 is an inner DC source group circuit 100 that includes one or more DC sources and one or more switching elements to increases a number of DC output voltage level used to smooth the waveform of the outer DC source group circuit. The output of the outer DC source group circuit 105, after smoothing with the inner DC source group circuit 100, is provided to an H-bridge circuit 110 that includes a plurality of switching elements in order to synthesize positive and negative cycles of the output voltage of the multilevel inverter, and to deliver the synthesized cycles to a load L.

The operation of the switching elements in the outer DC source group circuit 105, the inner DC source group circuit 100, and the H-bridge circuit 110 is controlled by a control circuit 115. As such, the control circuit 115 may include a processor, such as a microprocessor or microcontroller, connected to memory, such as RAM, ROM, EEPROM, and/or FLASH, and connected to interface circuitry in order to control the switching elements. The control circuit 115 may also include specialized circuits implemented on, for example, a field programmable gate array (FPGA) and/or an application specific integrated circuit (ASIC) in order to effect control of the switching elements. The control circuit 115 may also include discrete circuit components (transistors, capacitors, resistors, logic gats, etc.) in order to implement the control functionality. Portions of the functionality of the control circuit 115 may also be implemented as software stored in the aforementioned memory and executing on the aforementioned processor. The control circuitry 115 may also be co-located with the other circuits in the multilevel inverter or may be located remotely. As such, the specific implementation of the control circuitry 115 is not limiting upon the advancements described in the present disclosure.

The multilevel inverter according to exemplary aspects of the present disclosure is able to supply power to any type of AC load, such as a purely resistive load, a purely reactive load, or a complex load. For example, the load L may be an AC electric motor, a household appliance, computing systems, network devices (i.e., remotely located cellular base stations) or any other type of load known to those skilled in the art. As such the multilevel inverter may supply power to any load without departing from the scope of the present advancements.

Figure 2:
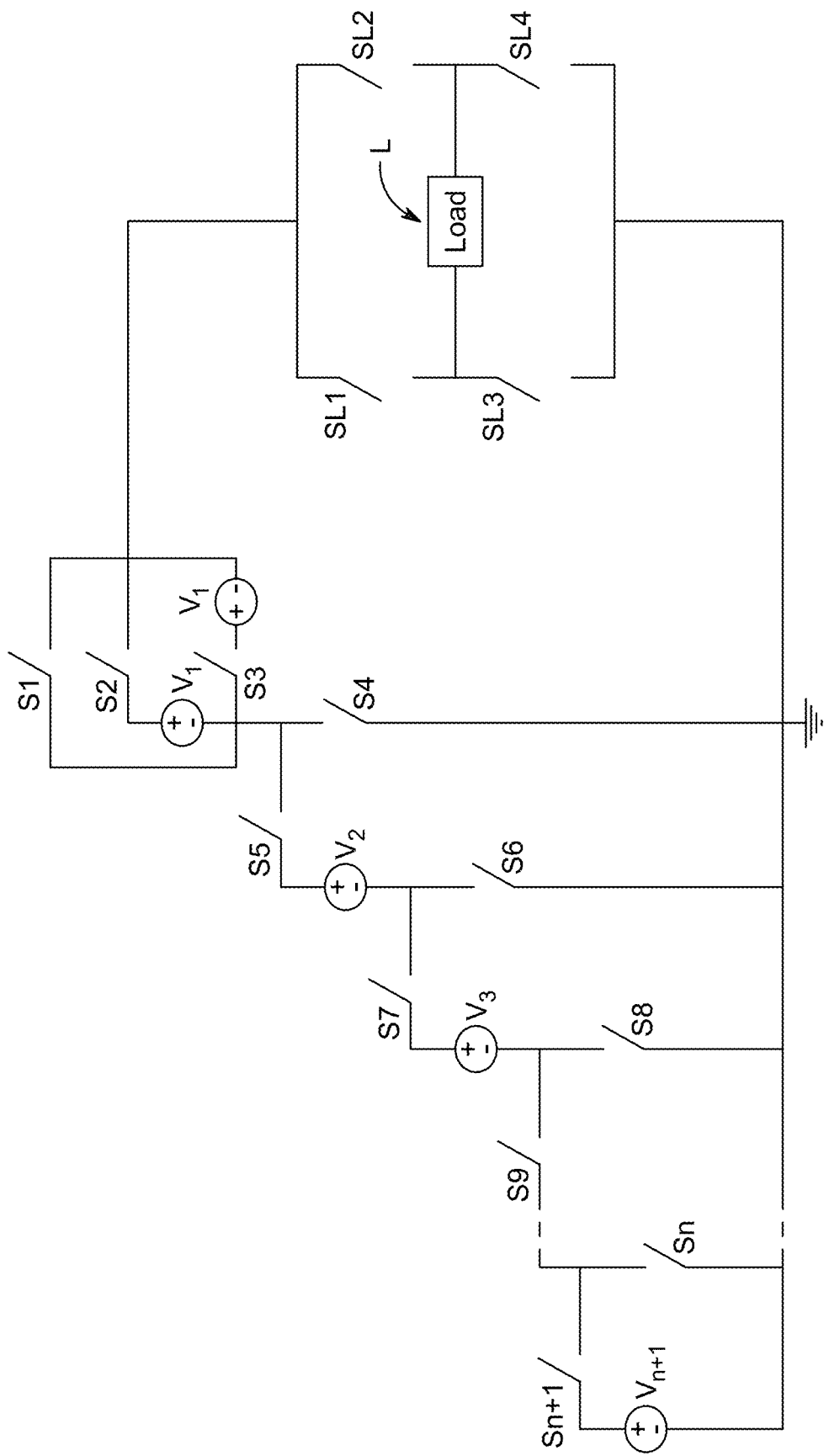
FIG. 2 is a schematic diagram of a multilevel inverter according to exemplary aspects of the present disclosure.

Next, the topology of a multilevel inverter according to exemplary aspects of the present disclosure is described with reference to the schematic drawing of FIG. 2. In FIG. 2, the outer DC source group circuit includes sources V1 and V1' and switching elements S1, S2 and S3. Sources V1 and V1' are connected in such a way that they are in reverse polarity with respect to the output of the outer DC source group circuit of FIG. 2. As can be appreciated, the outer DC source group circuit of FIG. 2 may include more than two sources. Therefore, the implementation illustrated in FIG. 2 is merely an example.

The inner DC source group circuit of FIG. 2 includes sources V2, V3 . . . Vn+1 and switches S4, S5, S6, S7, S8, S9, Sn, and Sn+1. The use of the variable "n" indicates that more than just three sources may be included in the inner DC source group circuit, as one of ordinary skill would recognize.

The multilevel inverter of FIG. 2 also includes an H-bridge circuit formed by switching elements SL1, SL2, SL3, and SL4, and connected to the load L. Note that the control circuitry has been omitted from FIG. 2 for the sake of brevity.

Although illustrated in FIG. 2 as switches, one of ordinary skill will recognize that the switches in FIG. 2 may be transistors, such as bipolar transistors, insulated gate bipolar transistors (IGBTs), junction field effect transistors (JFETs), metal oxide field effect transistors (MOSFETs), or thyristors. Of course, the devices used may also be npn, pnp, n-channel or p-channel without limitation. For the sake of clarity, biasing components for these devices have been omitted from FIG. 2.

The number of output voltage levels of the multilevel inverter of FIG. 2 may be determined using the following equations:

$$N_{steps}=4n+3 \quad (1)$$

$$N_{switch}=2n+8 \quad (2)$$

$$N_{source}=n+2 \quad (3)$$

$$V_{o,max}=\Sigma_{k=1}^{n-1}V_k=(2n+1)V_{dc} \quad (4)$$

Equation (1) determines $N_{steps}$ which is the number of output voltage steps generated by the multilevel inverter. Equation (2) determines the number of switching elements ($N_{switch}$) needed to generate the voltage steps $N_{steps}$. Equation (3) determines the number of DC sources ($N_{source}$) needed to generate the voltage steps $N_{steps}$, and equation (4) determines the maximum magnitude of the generated voltage ($V_{o,max}$). In equations 1-4, "n" is the desired number of desired voltage levels for the multilevel inverter.

It is also important to determine the variety of values of DC voltage sources ($N_{variety}$) and the value of the voltage blocks generated by each switch ($V_{block}$). These values determine the total cost of a multilevel inverter, and therefore to decrease a cost of a multilevel inverter these values must be minimized. $N_{variety}$ may be used as a design parameter and set to a desired value. Where $E_n$ is the voltage block of a switch $g_n$, $V_{block}$ may then be calculated by:

When $N_{variety}=2$ (n=2):

$$E_1=5V_{dc} \quad (6)$$

$$E_2=E_3=E_4=2V_{dc} \quad (7)$$

$$V_5=V_8=2V_{dc} \quad (8)$$

$$V_6=(2\times 2)V_{dc} \quad (9)$$

$$V_8=(2\times 1)V_{dc} \quad (10)$$

$$E_{S1}=E_{S2}=E_{S3}=E_{S4}=5V_{dc} \quad (11)$$

$$V_{block,2}=E_1+E_2+E_3+E_4+E_5+E_6+E_7+E_8+E_{S1}+E_{S2}E_{S3}+E_{S4}=41V_{dc} \quad (12)$$

Where $V_{dc}$ is an arbitrary DC voltage source level. When $N_{variety}=2$ (n=2):

$$E_1=7V_{dc} \quad (13)$$

$$E_2=E_3=E_4=2V_{dc} \quad (14)$$

$$V_5=V_8=V_{10}=2V_{dc} \quad (15)$$

$$V_6=(2\times 3)V_{dc} \quad (16)$$

$$V_7=(2\times 2)V_{dc} \quad (17)$$

$$E_{S1}=E_{S2}=E_{S3}=E_{S4}=7V_{dc} \quad (18)$$

$$V_{block,3}=E_1+E_2+E_3+E_4+E_5+E_6+E_7+E_8+E_9+E_{10}+E_{S1}+E_{S2}+E_{S3}+E_{S4}=41V_{dc} \quad (19)$$

From these equations, a general equation for $V_{block}$ may be determined as:

$$V_{block,n}=(2n^2+16n+11-2\Sigma_{k=2}^{n+1}k)V_{dc} \quad (20)$$

Figure 3:
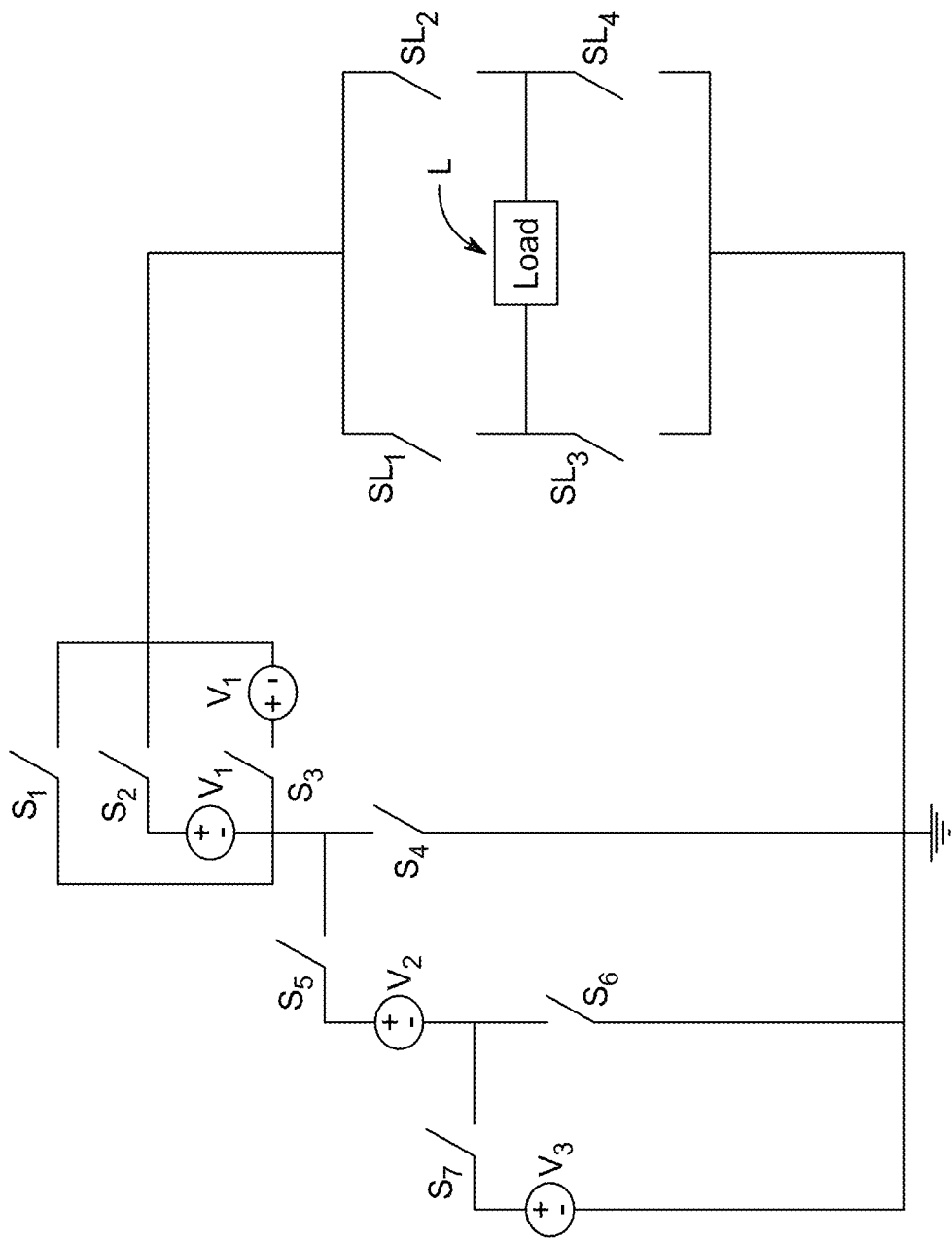
FIG. 3 is another schematic diagram of a multilevel inverter according to exemplary aspects of the present disclosure.
Figure 7:
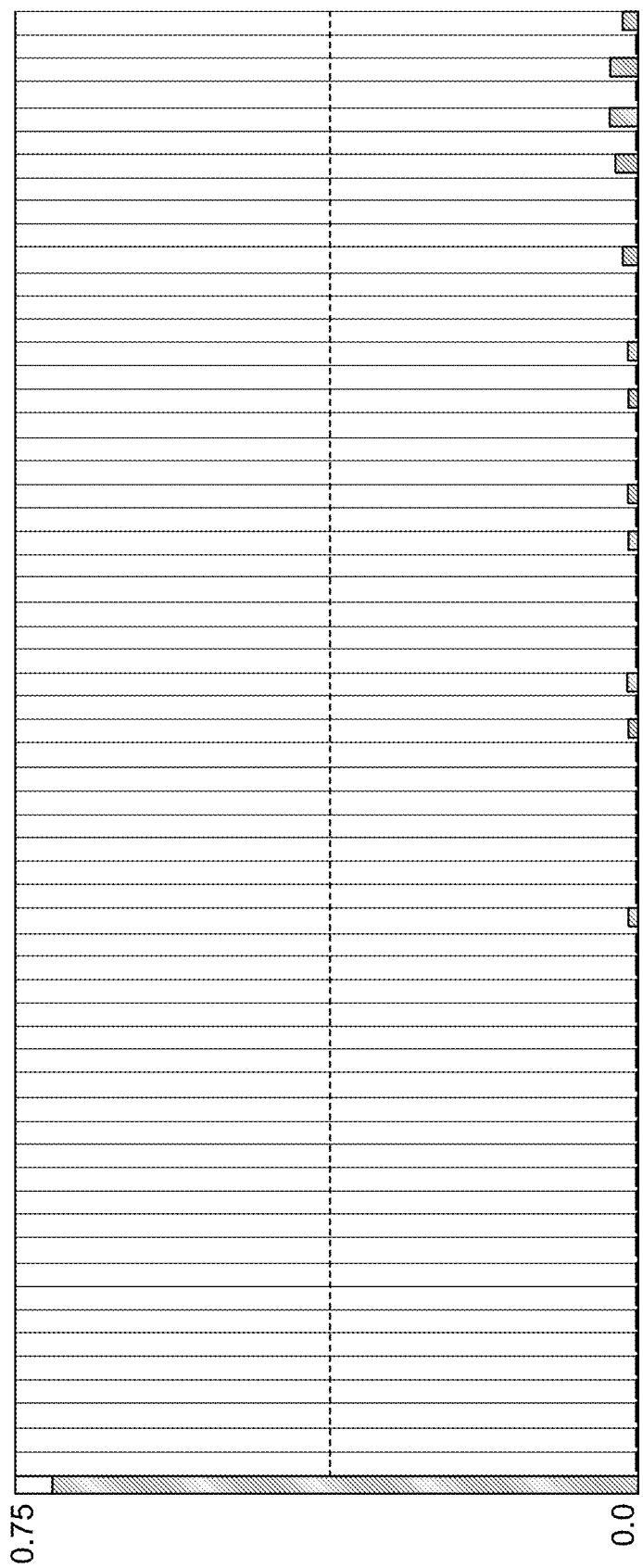
FIG. 7 is an output of switch g1 of a multilevel inverter according to exemplary aspects of the present disclosure.
Figure 8:
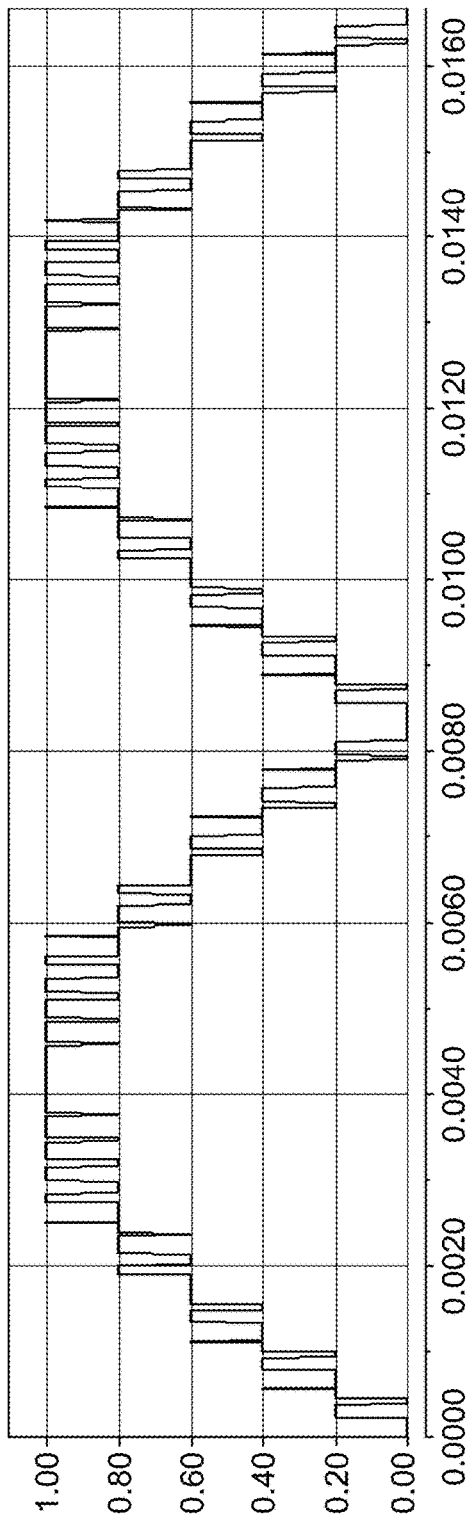
FIG. 8 is an output of switch g2 of a multilevel inverter according to exemplary aspects of the present disclosure.
Figure 9:
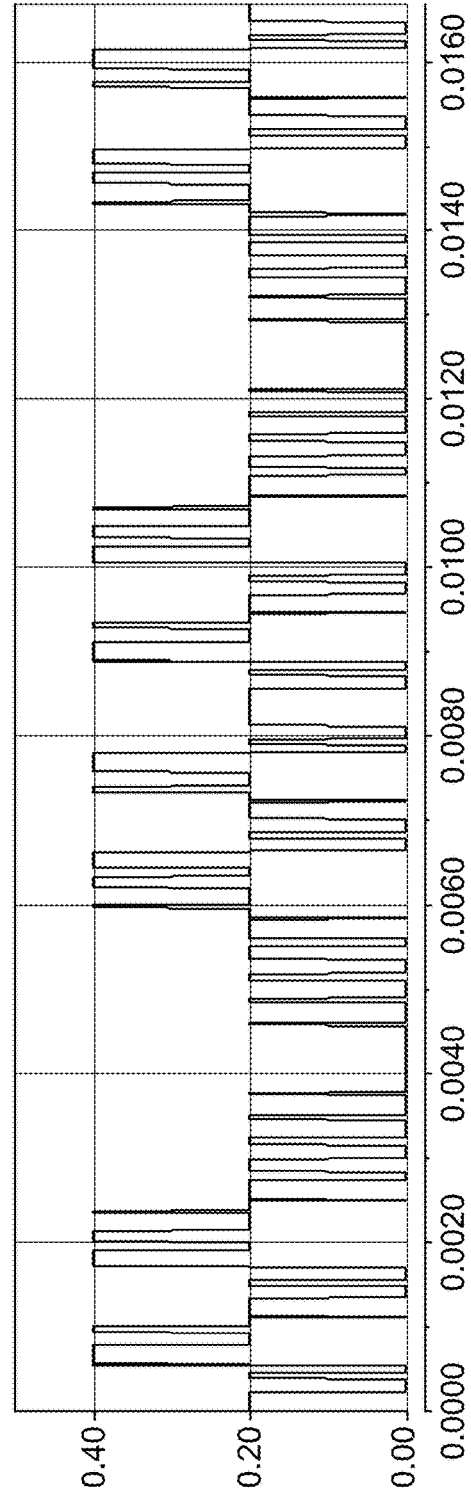
FIG. 9 is an output of switch g3 of a multilevel inverter according to exemplary aspects of the present disclosure.
Figure 10:
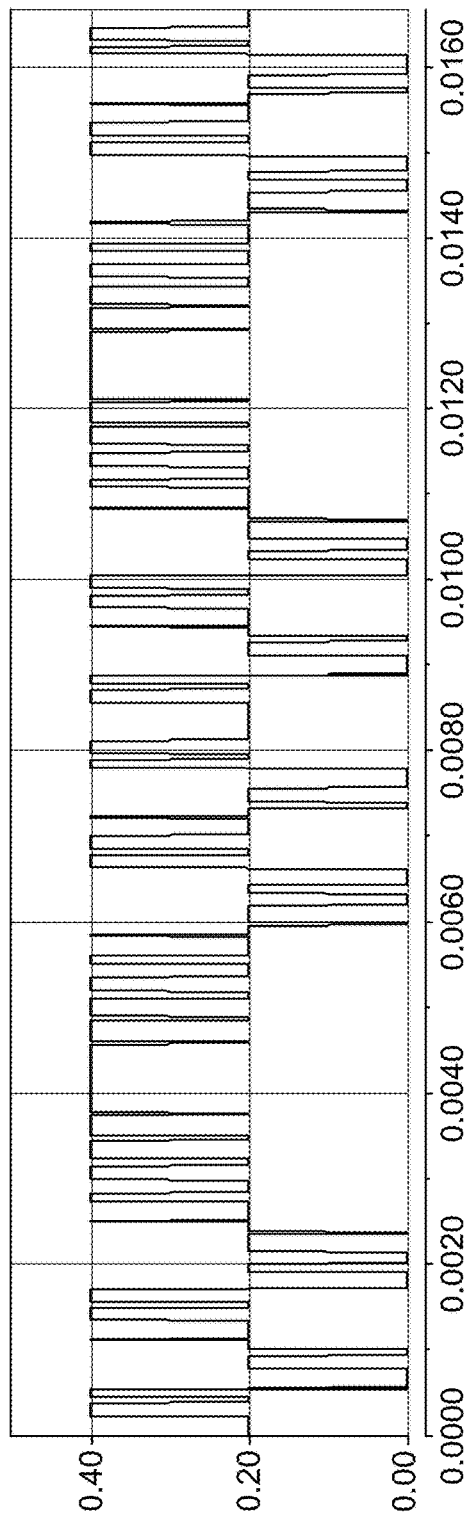
FIG. 10 is an output of switch g4 of a multilevel inverter according to exemplary aspects of the present disclosure.
Figure 11:
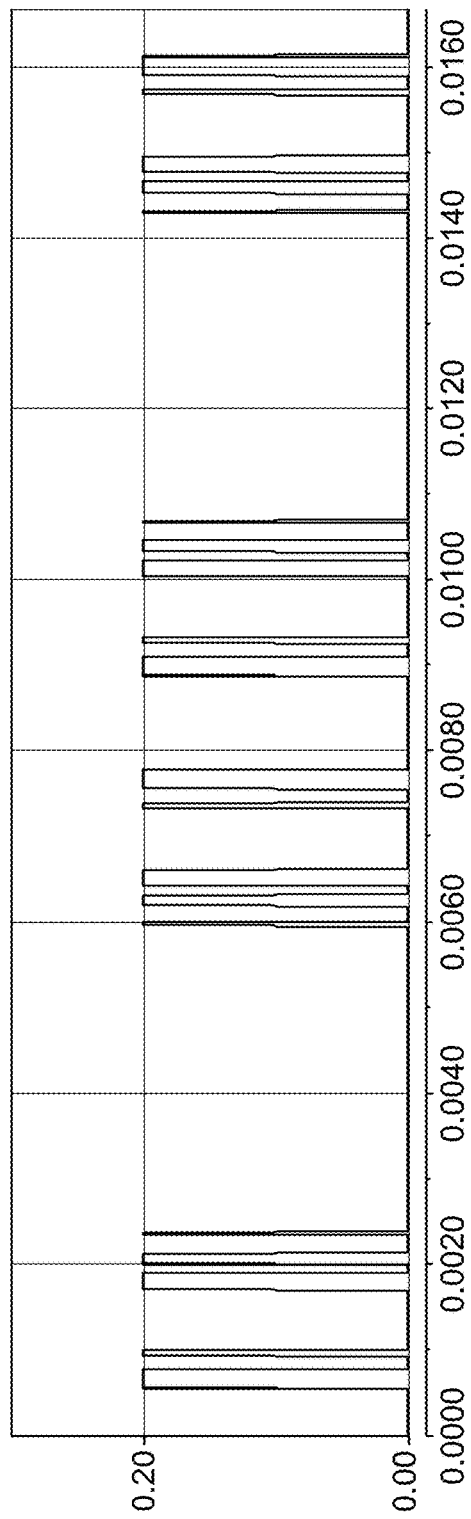
FIG. 11 is an output of switch g5 of a multilevel inverter according to exemplary aspects of the present disclosure.
Figure 12:
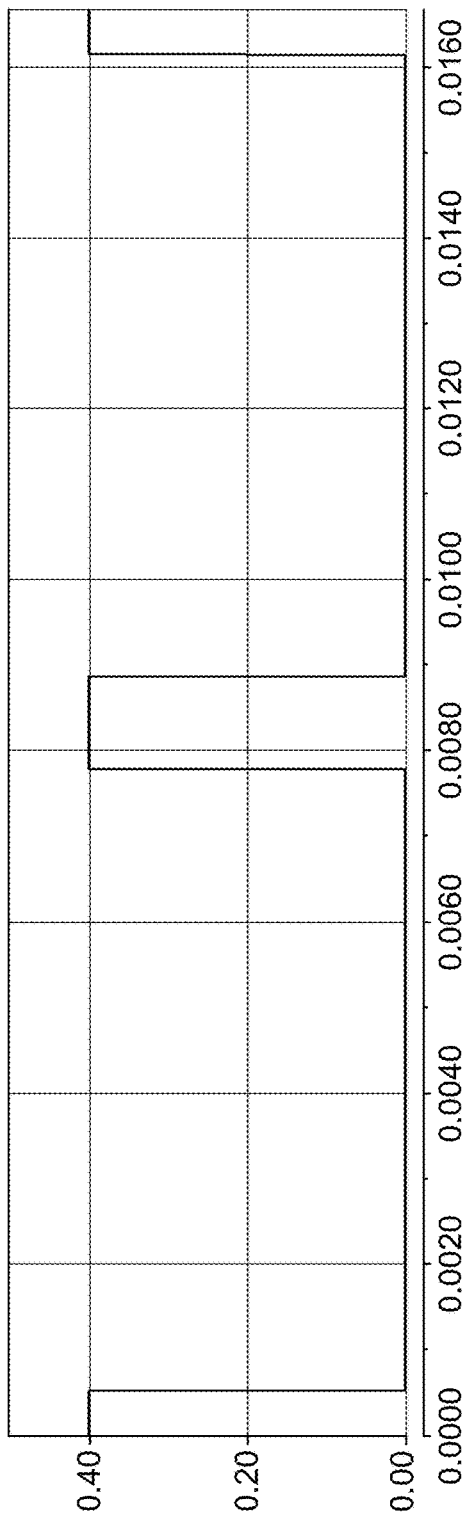
FIG. 12 is an output of switch g6 of a multilevel inverter according to exemplary aspects of the present disclosure.
Figure 13:
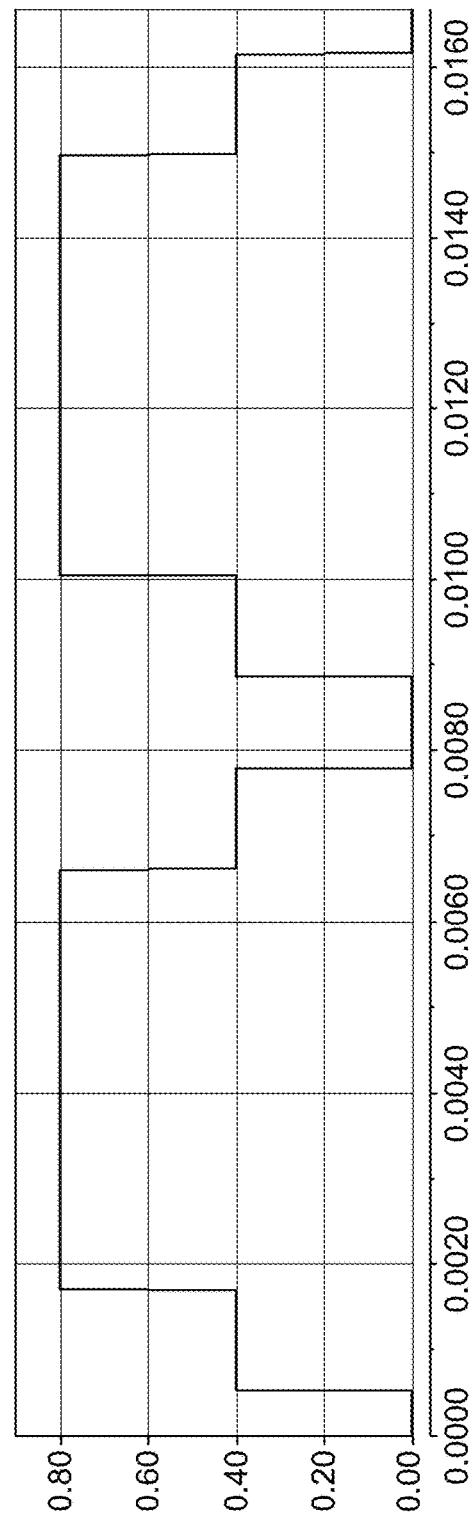
FIG. 13 is an output of switch g7 of a multilevel inverter according to exemplary aspects of the present disclosure.
Figure 14:
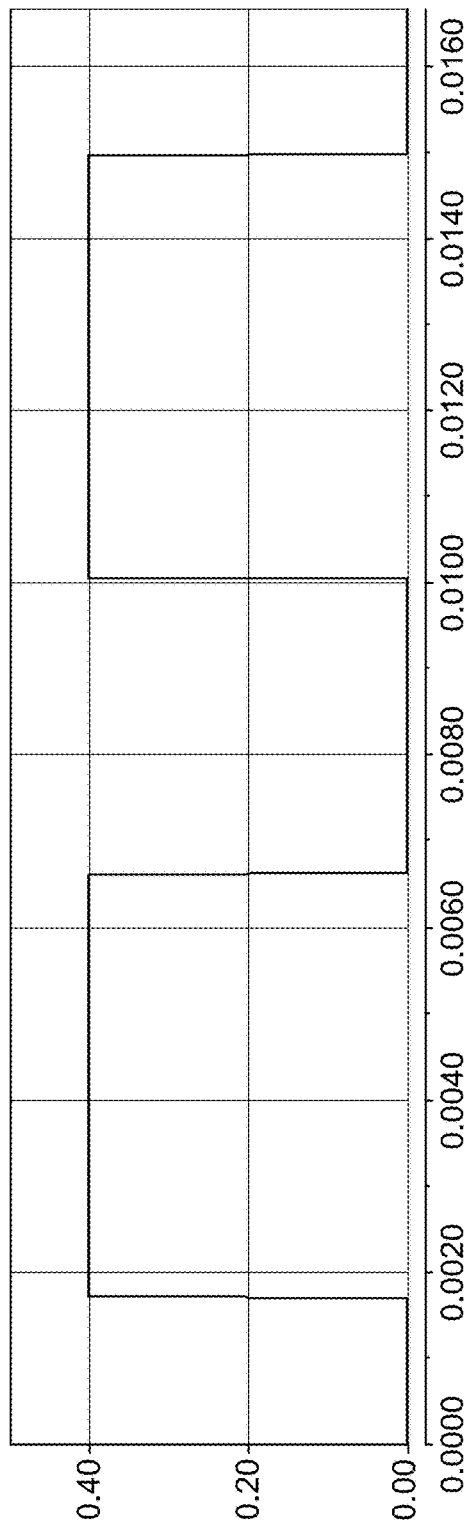
FIG. 14 is an output of switch g8 of a multilevel inverter according to exemplary aspects of the present disclosure.
Figure 15:
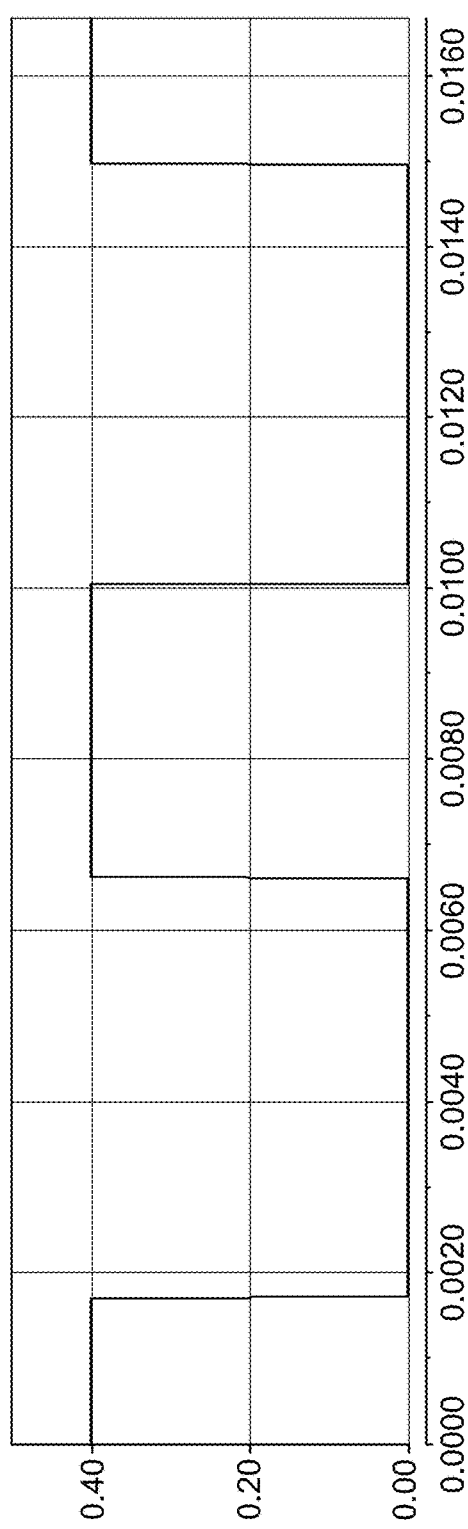
FIG. 15 is a graphed comparison of voltage blocks of conventional inverters and those of a multilevel inverter according to exemplary aspects of the present disclosure.

FIG. 3 is a schematic diagram of a 7-level multilevel inverter according to aspects of the present disclosure. In FIG. 7 the outer DC source group circuit includes S1, S2, S3, V1, and V1' (in opposite polarity to V1). The inner DC source group circuit includes S4, S5, S6, S7, V2 and V3, and the H-bridge circuit includes SL1, SL2, SL3, and SL4. The value of the voltage sources in FIG. 3 are V1=an arbitrary voltage ($V_{dc}$), and V2=V3=2Vdc. It is also important that during the operation of the multilevel inverter no DC voltage source V1, V1', V2, or V3 is short-circuited. Therefore, switching elements groups (S1, S2), (S1, S3), (S2, S3), (S4, S5, S6), (S4, S5, S7), and (S6, S7) should not turn on simultaneously.

In FIG. 3, the H-bridge circuit generates the positive and negative polarities by selectively opening and closing switching elements SL1, SL2, SL3, and SL4. For example, a positive polarity may be generated by simultaneously closing switching elements SL1 and SL4, and a negative polarity may be generated by simultaneously closing switching elements SL2 and SL3. Note that switching elements SL1 and SL2 should not be closed simultaneously, nor should switching elements SL3 and SL4. Also, all of the switching elements SL1, SL2, SL3 and SL4 should not be closed simultaneously in order to avoid short-circuiting the multilevel inverter.

Which of the switching elements in FIG. 3 are closed, and which are open, determines the voltage level(s) of the multilevel inverter. FIG. 4 is a table including switching element patterns to generate the various voltage levels of the multilevel inverter of FIG. 3. In FIG. 4, the first column denotes the state of the inverter, of which there are 8. The second column denotes the maximum output voltage for each state, and the third column denotes the voltages from the DC sources that are added and/or subtracted together in order to generate the corresponding maximum output voltage. The last column denotes the switching elements that are closed, or "on", in order to generate the corresponding voltage. For example, to generate a maximum output voltage of $V_{dc}$, switching elements S2 and S4 may be closed to place the inverter in the second state. Alternatively, switching elements S3, S5, and S6 may be closed in order to place the inverter in the third state, which also results in a maximum output of $V_{dc}$. Thus, by closing and opening the different switches S1-S7, it is possible to generate the voltage output levels, or voltage blocks, for the multilevel inverter: 0, $V_{dc}$, $2V_{dc}$, $3V_{dc}$, $4V_{dc}$, and $5V_{dc}$. As noted above, some maximum voltages levels may be generated using more than one state of the multilevel inverter (i.e., using more than one switch element pattern). As can be appreciated, the descriptions of the multilevel inverter with reference to FIGS. 3-4 are merely one example of the general multilevel inverter topology of FIG. 2, and other examples are possible without departing from the scope of the present disclosure.

Figure 5:
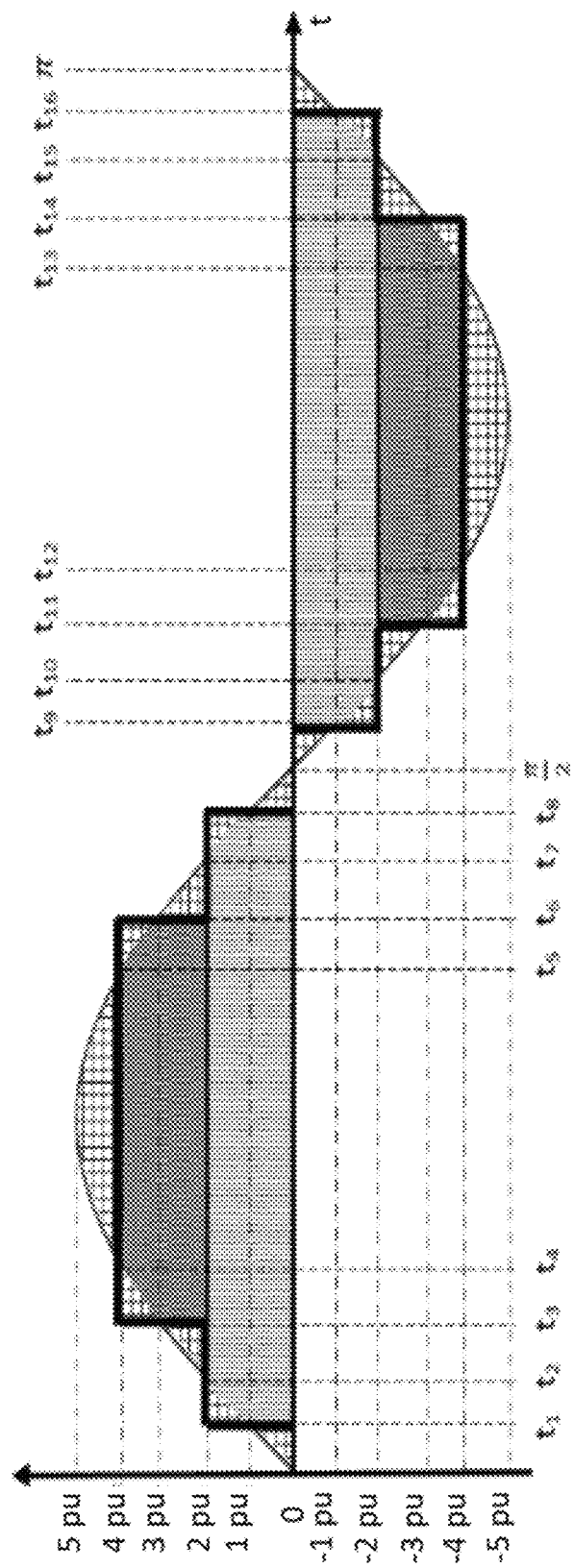
FIG. 5 is a schematic drawing of an output waveform of a multilevel inverter according to exemplary aspects of the present disclosure.

FIG. 5 is a schematic of an output signal of a multilevel inverter according to exemplary aspects of the present disclosure. In FIG. 5 the voltage levels generated by the inner DC source group circuit of a corresponding multilevel inverter are denoted as "pu." As illustrated in this figure, the waveform generated by the multilevel inverter includes two voltage blocks in each half cycle.

In order to generate this waveform, the switches of the multilevel inverter operate at different frequencies in a hybrid modulation scheme. The switches of the inner DC source group circuit are modulated to generate the shaded block areas in FIG. 5 according to the following equation:

$$v_{ref} = V_1 \sin(2\pi ft) - 0.4[u(t-t_1) - u(t-t_8) - u(t-t_9) + u(t-t_{16})] - 0.4[u(t-t_3) - u(t-t_6) - u(t-t_{11}) + u(t-t_{14})] \quad (21)$$

Where V1 is $V_{dc}$, f is the modulation frequency, t is time, and u(t) is a step function that, for example, generates the bold-lined waveform in FIG. 5.

To obtain a general expression for $v_{ref}$, the number of voltage blocks per half cycle is need. This value can be denotes as:

$$N_{core} = N_{cells} - 1 \quad (22)$$

Where $N_{core}$ is the number of voltage blocks per half cycle and $N_{cells}$ is the combined number of DC source cells in both the inner DC source group circuit and the outer DC source group circuit. For example, in the multilevel inverter of FIG. 3, $N_{cells}=3$ (V1 in the outer DC source group circuit, and V2 and V3 in the inner DC source group circuit).

To obtain the intervals of each voltage block, the peak of the voltage blocks ($V_{core}$) and the number of beginnings and ends of the voltage blocks per half cycle ($T_{core}$, for example, t1 and t2 in FIG. 5) are needed. $V_{core}$ and $T_{core}$ may be determined using the following equations:

$$V_{core} = \frac{1}{N_{core} + 0.5} \quad (23)$$

$$T_{core} = 4N_{core} \quad (24)$$

A general expression for $v_{ref}$ may then be derived:

$$v_{ref} = V_1 \sin(2\pi ft) - V_{core}\left[\sum_{i=1,3,5,...}^{\frac{T_{core}}{2}-1} u(t-t_i) - u(t-t_{i+T_{core}}) + \sum_{j=2,4,6,...}^{\frac{T_{core}}{2}-2} u(t-t_{T_{core}-j}) - u(t-t_{2T_{core}-j})\right] \quad (25)$$

Where $v_{ref}$ is a reference waveform for the output of the multilevel inverter, and is modulated using two triangular carriers cr1 and cr2. The modulation index for $v_{ref}$ is:

$$m = \frac{v_{ref}}{cr_{1,2(peak)}} \quad (26)$$

Where $0 \le m \le 1$.

Figure 6:
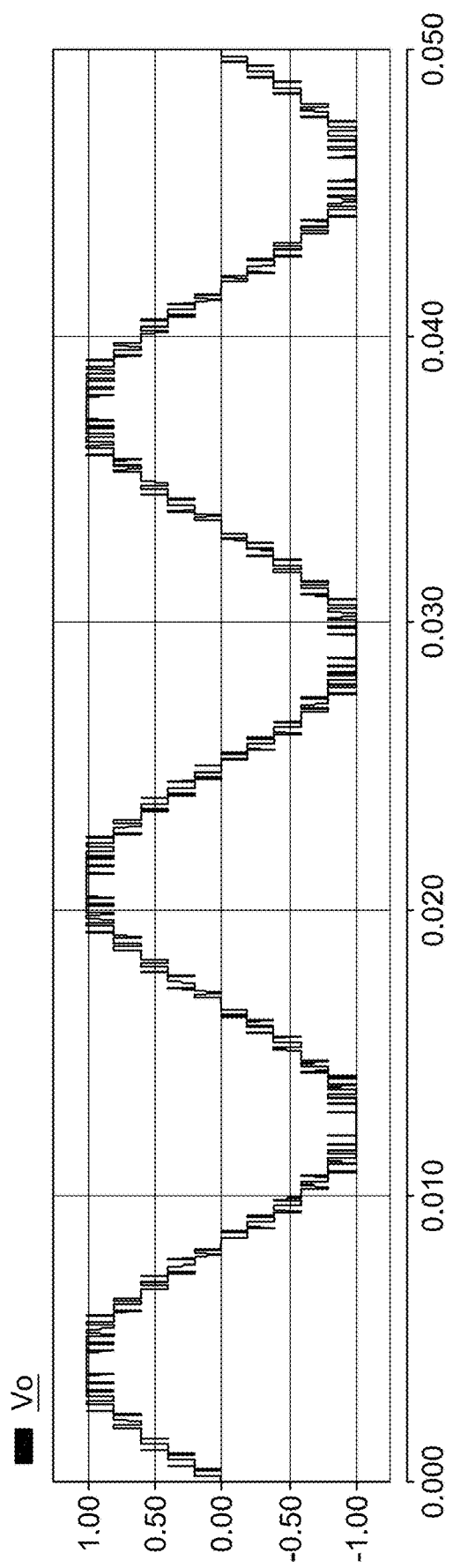
FIG. 6 is an output of a multilevel inverter according to exemplary aspects of the present disclosure.

FIG. 6 is an output of a multilevel inverter according to exemplary aspects of the present disclosure. In order to evaluate the performance of the multilevel inverter, the total harmonic distortion (THD) of the output may be evaluated. For example, an acceptable THD value is 3.6%. However, other THD values are also possible depending on the particular application of the inverter. The equation for THD is:

$$THD = \frac{\sqrt{(\sum_{n=3,5,7,...}^{\infty} b_n)}}{b_1} \quad (27)$$

Where $b_n$ is determined by:

$$b_n = \frac{4V_{dc}}{n\pi}\left[1 + \sum_{i=1}^{N_{levels}-2} \cos(n\alpha_i)\right] \text{ for } n \text{ odd} \quad (28)$$

FIG. 7 is the harmonic content of the output waveform of FIG. 6. As can be seen the total harmonic distortion in FIG. 7 is very low since the harmonic content of the output waveform is also very low. Moreover, FIGS. 8-15 illustrate the voltages of the output of the various switches S1-S8 in the multilevel inverter that, when composited together, form the output waveform of FIG. 6.

Another measure of the performance of the multilevel inverter according to exemplary aspects of the present disclosure is the losses of the inverter. Generally there are two types of losses: conduction loss and switching loss. Conduction loss is the loss incurred when a device is in full conduction. If, for example, IGBTs are used as the switching elements of the multilevel inverter, the conduction losses of the IGBT are given by:

$$P_{c,IGBT}(t) = [V_{IGBT} + R_{IGBT}(t)i^\beta(t)]i(t) \quad (28)$$

$$P_{c,D}(t) = [V_D + R_D i(t)]i(t) \quad (29)$$

Where $P_{c,IGBT}$ is the IGBT conduction loss, $P_{c,D}$ is the diode conduction loss, and where:
$V_{IGBT}$: the forward voltage drop of the IGBT
$V_D$: the forward voltage drop of the diode
$R_T$: and the equivalent resistance of the transistor
$R_D$: the equivalent resistance of the diode
$\beta$: a constant related to the specification of the transistor.

If there are $N_{IGBT}$ (number of IGBTs) and $N_D$ (the number of diodes) in the conduction path at a given time instant, t, then the average power value of the multilevel inverter conduction power loss ($P_c$) is:

$$P_c = \frac{1}{2\pi}\int_0^{2\pi}[N_{IGBT}(t)P_{c,IGBT}(t) + N_D(t)P_{c,D}(t)]dt \quad (30)$$

Switching loss is the loss incurred as the switching elements transition from full conduction to zero conduction.

Considering the linear variations of the voltage and current of the switching elements during the switching period, the turn-on ($E_{on,k}$) and turn-off ($E_{off,k}$), the energy losses in the switching element K are given by:

$$E_{on,k} = \int_0^{t_{on}} v(t)i(t)dt = \tfrac{1}{6} V_{SW,k} I t_{on} \qquad (31)$$

$$E_{off,k} = \int_0^{t_{off}} v(t)i(t)dt = \tfrac{1}{6} V_{SW,k} I t_{off} \qquad (32)$$

Where:
f: the fundamental frequency
$N_{on,k}$ and $N_{off,k}$: the numbers of turn-on and turn-off of the switch k during a fundamental cycle.
$E_{on,ki}$: the energy loss of the switch k during the $i^{th}$ turn-on
$E_{off,ki}$: the energy loss of the switch k during the $i^{th}$ turn-off.

This results in a total switching power loss of ($P_{sw}$):

$$P_{sw} = f \sum_{k=1}^{N_{switch}} \left( \sum_{i=1}^{N_{on,k}} E_{on,ki} + \sum_{i=1}^{N_{off,k}} E_{off,ki} \right) \qquad (33)$$

Where:
f: the fundamental frequency
$N_{on,k}$ and $N_{off,k}$: the numbers of turn-on and turn-off of the switch k during a fundamental cycle.
$E_{on,ki}$: the energy loss of the switch k during the $i^{th}$ turn-on
$E_{off,ki}$: the energy loss of the switch k during the $i^{th}$ turn-off.

Finally, the total multilevel inverter loss ($P_{Loss}$) is given by:

$$P_{Loss} = P_c + P_{sw} \qquad (34)$$

And the inverter efficiency is given by:

$$\eta = \frac{P_{out}}{P_{in}} = \frac{P_{out}}{P_{out} + P_{Loss}} \qquad (35)$$

Where $P_{out}$ is the output power of the multilevel inverter, and $P_{in}$ is the input power of the multilevel inverter.

Figure 16:
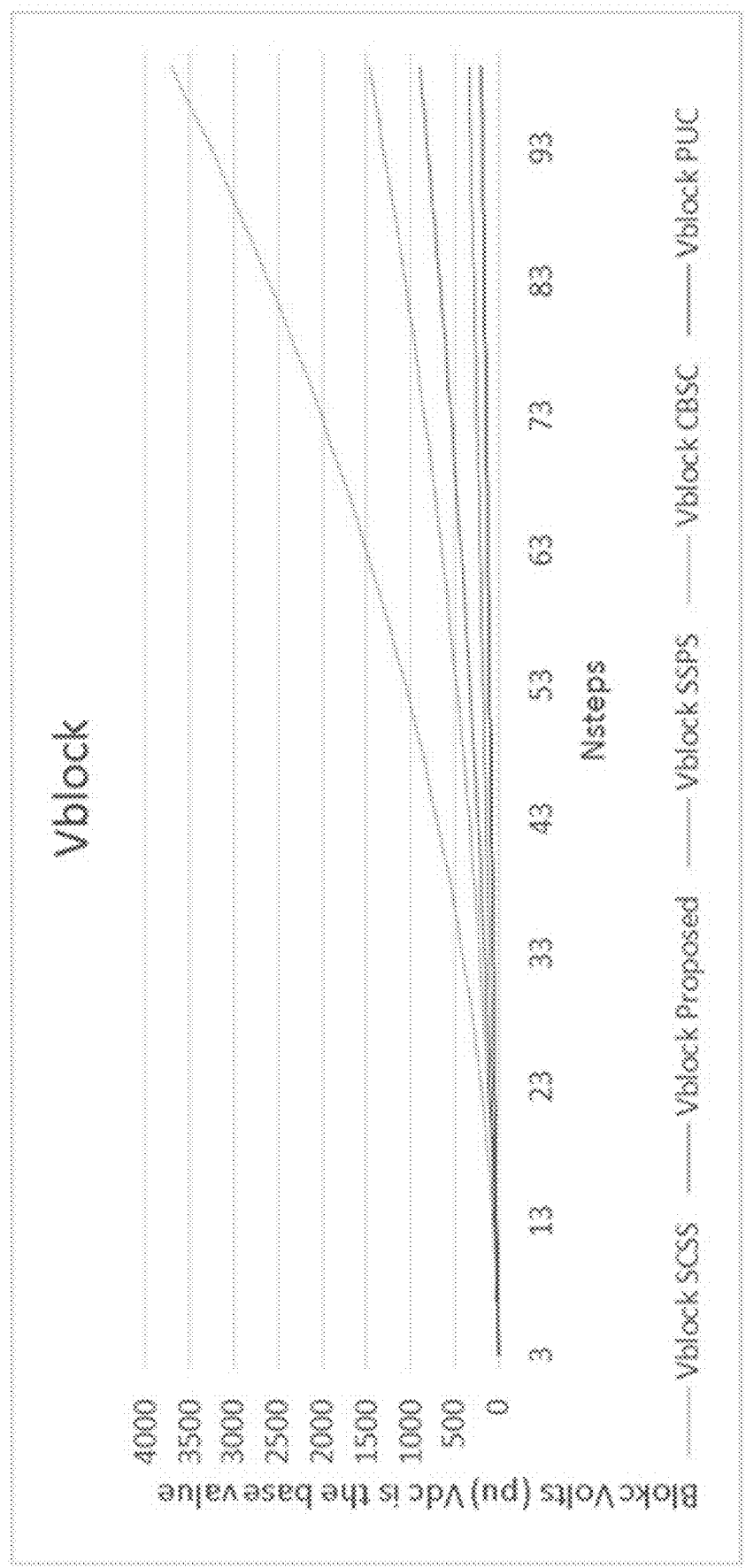
FIG. 16 is a harmonic spectrum generated by a multilevel inverter according to exemplary aspects of the present disclosure.

FIG. 16 is a graph of a comparison of the number of voltage steps ($N_{steps}$) versus the output voltage blocks of conventional inverters, such as SSPS, SCSS, PUC and CBSC inverters, and that of a multilevel inverter according to exemplary aspects of the present disclosure. As can be seen from this figure, the multilevel inverter described herein is advantageously able to use a relatively large number of voltage steps over a relatively small range of voltages, reducing the size of each step and resulting in a smooth output voltage waveform. The multilevel inverter according to the present disclosure does this while using a relatively small number of components.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of operating a multilevel inverter apparatus, comprising:
    generating a plurality of voltage levels with an inner DC source group circuit of the multilevel inverter apparatus;
    generating a substantially sinusoidal output voltage with an outer DC source group circuit of the multilevel inverter apparatus; and
    supplying the substantially sinusoidal output voltage at alternating polarities to load contacts of an H-bridge circuit,
    wherein the multilevel inverter apparatus comprises:
    the inner DC source group circuit configured to generate the plurality of voltage levels, the inner DC source group having a first plurality of DC sources and a first plurality of switching elements, wherein the first plurality of DC sources is greater than or equal to two;
    the outer DC source group circuit configured to generate the substantially sinusoidal output voltage using, at least in part, the plurality of voltage levels generated by the inner DC source group circuit, the outer DC source group circuit having an input contact and an output contact, wherein the input contact is connected to the inner DC source group circuit, the outer DC source group circuit including:
        a first DC voltage source, a second DC voltage source, a second plurality of switching elements including a first switching element, a second switching element and a third switching element,
        wherein a negative terminal of the first DC voltage source is connected to the input contact,
        wherein the first switching element is connected between the input contact and the output contact,
        wherein the second switching element is connected between a positive terminal of the first DC voltage source and the output contact,
        wherein the third switching element is connected between the input contact and a negative terminal of the second DC voltage source,
        wherein the negative terminal of the second DC voltage source is connected to the output contact; and
    the H-bridge circuit connected to the output contact, the H-bridge circuit having load contacts and a third plurality of switching elements;
    a control circuit operatively connected to the first, second and third plurality of switching elements, the control circuit including circuitry and a computer-readable medium comprising program instructions, executable by processing circuitry, to cause the processing circuitry to selectively actuate the first, second and third plurality of switching elements by hybrid modulation to supply the plurality of voltage levels in a substantially sinusoidal output voltage at alternating polarities to the load contacts.

2. The method according to claim 1, further comprising:
selectively interconnecting, with the first, second and third plurality of switching elements, the first and second DC voltage sources included in the outer DC source group circuit to generate the substantially sinusoidal output voltage.

3. The method according to claim 2, further comprising:
selectively interconnecting, with the first, second and third plurality of switching elements, the first and second DC voltage sources included in the inner DC source group circuit to generate the plurality of voltage levels; and
providing, via at least one switching element, the plurality of voltage levels to the outer DC source group voltage.

4. The method according to claim 3, further comprising:
controlling, with the circuitry of the control circuit, the selective interconnection of the DC voltage sources included in the outer DC source group circuit and the selective interconnection of the DC voltage sources in the inner DC source group circuit.

5. The method according to claim 4, further comprising:
switching, with the control circuitry, alternate pairs of switching elements in the H-bridge circuit to provide the substantially sinusoidal output voltage at the alternating polarities to the load contacts.

* * * * *